United States Patent
Sweeney et al.

(10) Patent No.: US 6,546,551 B1
(45) Date of Patent: Apr. 8, 2003

(54) METHOD FOR ACCURATELY EXTRACTING LIBRARY-BASED OBJECT-ORIENTED APPLICATIONS

(75) Inventors: Peter Francis Sweeney, Spring Valley, NY (US); Frank Tip, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,224

(22) Filed: Sep. 28, 1999

(51) Int. Cl.[7] .................................................. G06F 9/45

(52) U.S. Cl. ..................... 717/154; 717/153; 717/148; 717/165; 717/156

(58) Field of Search ............................... 717/151, 108, 717/116, 131, 132, 133, 154, 155, 153, 56, 157, 128, 109, 113, 104, 148, 165, 156; 707/1, 10, 103 R; 711/171; 345/594

(56) References Cited

U.S. PATENT DOCUMENTS

| | | | | |
|---|---|---|---|---|
| 5,241,673 A | * | 8/1993 | Schelvis ................. | 707/103 R |
| 5,794,041 A | * | 8/1998 | Law et al. ................. | 717/104 |
| 5,872,973 A | * | 2/1999 | Mitchell et al. ............ | 709/305 |
| 5,907,843 A | * | 5/1999 | Cleron et al. ................. | 707/1 |
| 5,915,252 A | * | 6/1999 | Misheski et al. ............. | 707/10 |
| 5,983,020 A | * | 11/1999 | Sweeney et al. .............. | 706/47 |
| 6,093,216 A | * | 7/2000 | Adl-Tabatabai et al. .... | 717/128 |
| 6,230,314 B1 | * | 5/2001 | Sweeney et al. ............ | 717/108 |
| 6,292,933 B1 | * | 9/2001 | Bahrs et al. ................ | 717/107 |
| 6,401,182 B1 | * | 6/2002 | Sweeney ..................... | 711/171 |
| 6,442,748 B1 | * | 8/2002 | Bowman-Amuah ......... | 717/101 |

OTHER PUBLICATIONS

Title: Reflection in an Object–Oriented Concurrent Language, author: Watanabe et al, ACM, 1988.*

Title: Cost effective object space management for hardware assisted real time garbage collection, author: Nilson, ACM, 1992.*

Title: Call graph construction in Object–Oriented Languages, Grove et al, ACM, Oct., 1997.*

Title: Constraint systems for useless variable elimination, ACM, Wand et al, Jan., 1999.*

Title: Thinking in Java, author: Bruce Eckel, Publication date: Feb., 1998.*

Title: Re–engineering clan Hierarchies Using Concept Analysis, ACM, Snelting et al, 1998.*

Chuck McManis. *Take an In–Depth look at the Java Reflection API.* wysiwyg://5/http://www.javaworls.com/jw–09–1997/jw–09–indepth.html.

Raja Vallee–Rai, et al. *Soot–a Java Bytecode Optimization Framework.* Sable Research Group, School of Computer Science, McGill University.

(List continued on next page.)

*Primary Examiner*—Gregory Morse
*Assistant Examiner*—Chameli C. Das
(74) *Attorney, Agent, or Firm*—F. Chau & Associates, LLP (57) ABSTRACT

The present invention is capable of accurately extracting multiple applications with respect to a class library. The invention relies on a configuration file for an application program and/or library, which describes how program components in the program/library should be preserved under specified conditions. The invention may be used in application extraction tools, and in tools that aim at enhancing performance using whole-program optimizations. The invention may be used as an optimization to reduce application size by eliminating unreachable methods. In the alternative, the invention may be used as a basis for optimizations that reduce execution time (e.g., by means of call devirtualization), and as a basis for tools for program understanding and debugging.

20 Claims, 4 Drawing Sheets

OTHER PUBLICATIONS

Agesen, O. *Concrete Type Inference: Delivering Object–Oriented Applications*. PhD thesis, Stanford University, Dec. 1995. Appeared as Sun Microsystems Laboratories Technical Report SMLI TR–96–52.

Agesen, O., and Ungar, D. Sifting out the gold: Delivering compact applications from an exploratory object–oriented programming environment. *In Proceedings of the Ninth Annual Conference on Object Oriented Programming Systems, Languages, and Applications (OOPSLA '94)* (Portland, OR, 1994), pp. 335–370. ACM SIGPLAN *Notices* 29(10).

Aho, A., Sethi, R., and Ullman, J. *Compilers. Principles, Techniques and Tools*. Addison–Wesley, 1986.

Bacon, D. F. *Fast and Effective Optimization of Statically Typed Object–Oriented Languages*. PhD thesis, Computer Science Division, University of California, Berkeley, Dec. 1997. Report No. UCB/CSD–98–1017.

Bacon, D. F., and Sweeney, P. F. Fast static analysis of C++ virtual function calls. *In Proceedings of the Eleventh Annual Conference on Object–Oriented Programming Systems, Languages and Applications (OOPSLA '96)* (San Jose, CA, 1996), pp. 324–341. Sigplan Notices 31(10).

Dean, J., Grove, D., and Chambers, C. Optimiaztion of object–oriented programs using static class hierarchy analysis. In *Proceedings of the Ninth European conference on Object–Oriented Programming (ECOOP '95)*(Aarhus, Denmark, Aug. 1995), W. Olthoff, Ed., Springer–Verlag, pp. 77–101.

ParcPlace Systems. *ParcPlace Smalltalk*, objectworks release 4.1 ed., 1992. Section 16: Deplaying an Application, Section 28: Binary Object Streaming Service.

Sweeney, P. F., and Tip, F. A study of dead data members in C++ applications. In *Proceedings of the ACM SIGPLAN '98 Conference on Programming Language Design and Implementation* (Montreal, Canada, Jun. 1998), pp. 324–332. ACM Sigplan Notices 33(6).

Tip, F., Choi, J.–D., Field, J., and Ramalingam, G. Slicing class hierarchies in C++. In *Proceedings of the Eleventh Annual Conference on Object–Oriented Programming Systems, Languages, and Applications (OOPSLA '96)*(San Jose, CA, 1996), pp. 179–197. ACM SIGPLAN Notices 31(10).

Tip, F., Laffra, C., Sweeney, P., and Streeter, D. Practical experience with an application extractor for java. In proceedings of the Fourteenth Annual conference on Object–Oriented Programming Systems, Languages, and Applications (OOPSLA '99)(Denver, CO, 1999). To appear.

Tip, F., and Sweeney, P. Class hierarchy specialization. In *Proceedings of the Twelfth Annual Conference on Object–Oriented Programming Systems, Languages and Applications* (OOPSLA '97)(Atlanta, GA, 1997), pp. 271–285. ACM SIGPLAN Notices 32(10).

* cited by examiner

```
PRESERVECLASS M    WHEN LIVEMETHOD L.foo()
PRESERVEFIELD M.x  WHEN LIVEMETHOD L.foo()

PRESERVECLASS N    WHEN LIVEMETHOD L.bar()
PRESERVEMETHOD N.baz() WHEN LIVEMETHOD L.bar()
```

FIG. 3

```
import java.lang.Class;
import java.lang.reflect.*;

public class L {
  static void foo(){
    try {
      Class c = Class.forName("M");
      M m = (M)c.newInstance();
      Field fld = c.getField("x");
      fld.setInt(m, 10);
    }
    catch (Exception e){ ... }
  } static void bar(){
    try {
      Class c = Class.forName("N");
      N n = (N)c.newInstance();
      Method method = c.getMethod("baz",new Class[0]);
      method.invoke(n, new Object[0]);
    }
    catch (Exception e){ ... }
  }
};

class M {
  public int x;
};

class N {
  public void baz(){ ... }
};
```

FIG. 5

```
import java.lang.Class;
import java.lang.reflect.*;

public class A {
   public static void main(String args[]){
      ...
      L.foo();
      ...
      Class cls = Class.forName("B");
      B b = (B)cls.newInstance();
      Method method = cls.getMethod("zip", new Class[0]);
      method.invoke(n, new Object[0]);
      ...
      C c = new C();
      c.zap();
   }
};

class B {
   void zip(){ ... };
};

class C {
   void zap (){ ... };
   void unused (){ ... };
};
```

FIG. 6

```
IMPORT library.conf
PRESERVECLASS B
PRESERVEMETHOD B.zip()
```

FIG. 7

```
import java.lang.Class;
import java.lang.reflect.*;

public class L {
  static void foo(){
    try {
      Class c = Class.forName("M");
      M m = (M)c.newInstance();
      Field fld = c.getField("x");
      fld.setInt(m, 10);
    }
    catch (Exception e){ ... }
  }
};

class M {
  public int x;
};

public class A {
  public static void main(String args[]){
    ...
    L.foo();
    ...
    Class cls = Class.forName("B");
    B b = (B)cls.newInstance();
    Method method = cls.getMethod("zip", new Class[0]);
    method.invoke(n, new Object[0]);
    ...
    C c = new C();
    c.zap();
  }
};

class B {
  void zip(){ ... };
};

class C {
  void zap (){ ... };
};
```

METHOD FOR ACCURATELY EXTRACTING LIBRARY-BASED OBJECT-ORIENTED APPLICATIONS

BACKGROUND OF THE INVENTION

1. Field of the Invention

The present invention generally relates to object-oriented programming (OOP), and in particular to OOP systems supporting the C++ and Java™ programming languages.

2. Description of the Related Art

Object-oriented programming languages provide a number of features such as classes, inheritance, and virtual methods. These object-oriented features have several advantages. In particular, they enable the creation of class libraries that can be reused by many different applications, in many different contexts.

Class libraries are usually distributed separately from applications that use them. A disadvantage of this traditional distribution model is that the shipped class libraries can be very large, and hence require large amounts of space to store them, and large amounts of time to download them. In cases where an application only uses a small part of a class library's functionality, distribution of the entire library is often undesirable, because the user effectively pays a penalty for unused library features. A more detailed description of such problems is set forth in Tip et al., "Practical experience with an application extractor for java™," In *Proceedings of the Fourteenth Annual Conference on Object-Oriented Programming Systems, Languages, and Applications* (OOPSLA'99) (Denver, Colo., 1999), herein incorporated by reference in its entirety.

To address this problem, application extraction tools have been designed and implemented. Such tools are discussed in Agesen et al., "Sifting out the gold: Delivering compact applications from an exploratory object-oriented programming environment," In *Proceedings of the Ninth Annual Conference on Object-Oriented Programming Systems, Languages, and Applications* (OOPSLA'94) (Portland, Oreg., 1994), *ACM SIGPLAN Notices* 29(10), pp. 355–370; Agesen, "Concrete Type Inference: Delivering Object-Oriented Applications," Sun Microsystems Laboratories Technical Report SMLI TR-96-52, December 1995; Tip et al., "Practical experience with an application extractor for java™," In *Proceedings of the Fourteenth Annual Conference on Object-Oriented Programming Systems, Languages, and Applications* (OOPSLA'99) (Denver, Colo., 1999); *IBM Smalltalk User's Guide,* version 3, release 0 ed., IBM Corp, 1995, Chapters 36–38; Smalltalk/V for win32 Programming, Digitalk Inc., 1993, Chapter 17; and ParcPlace Smalltalk, objectworks release 4.1 ed., 1992, Sections 16, 28; herein incorporated by reference in their entirety. Such tools can perform a static whole-program analysis of the application along with the libraries that it depends on to determine the parts of the library and the application that are used. Subsequently, program transformations and optimizations are performed that eliminate the unused functionality of the application and the library, thereby reducing both application size and download time.

Modern object-oriented programming environments such as the Java™ platform load object oriented programs dynamically, create object instances dynamically when they are needed, and link such object instances dynamically for execution. In addition, such platforms typically include a reflection mechanism by which an object-oriented program can fetch information about a class of objects, or access program components by specifying their name. For example, a program can inquire about the name of a class associated with an object reference, or the number of methods defined in a class. Dynamic loading is another example of reflection. Here, the programmer instructs the platform to load a class with a specified name, after which instances of this class can be created. For a more detailed description of the Java™ reflection mechanism, see McManis, "Take an in-depth look at the Java™ Reflection API", http://www.javaworld.com/jw-09-1997/jw-09-indepth.html, herein incorporated by reference in its entirety. The use of reflection poses a problem for application extraction tools because a static analysis alone cannot determine which classes are instantiated using reflection, and which methods are invoked using reflection. Without this information, a safe approximation of the application's call graph cannot be constructed; and without a safe call graph, it is unclear which methods are unused so that extraction of the application is impossible.

In order to handle applications that use reflection, or applications that uses class libraries in which reflection is used, application extraction tools require additional information from the user. In current application extraction tools, this information takes the form of a list of the classes, methods, and fields in an application that are accessed using reflection. This information is then used to construct a safe approximation of the call graph, and the application can be extracted safely. The drawbacks of this approach have to do with the fact that the set of program components accessed using reflection in a class library depend on the library features used by an application. Hence, if a user wants to extract multiple applications with regard to the same library, he is faced with two options:

(1) Construct a global list of program components in the library that may be accessed anywhere in the class library using reflection. This list can safely be used for extracting any applications with respect to the library; or (2) For a given application that is to be extracted with respect to the library, construct a list of program components in the library that are accessed using reflection in the parts of the library used by that application.

Option (1) has the advantage that only a single "configuration file" needs to be written for the library, but it has the disadvantage of being overly conservative: the extracted applications may contain parts of the library that they do not use.

Option (2) has the advantage that each application is extracted only with the parts of the library that it uses, but it has the disadvantage that a separate configuration file is required for each application.

Therefore, there is a need in the art to provide a mechanism for accurately and efficiently extracting object-oriented components of a library that are potentially used in the execution of multiple applications.

SUMMARY OF THE INVENTION

The problems presented above and the related problems of the prior art are solved by the present invention, method, and apparatus for accurately extracting library-based object-oriented applications. The present invention is capable of accurately extracting multiple applications with respect to a class library. The invention relies on a single configuration file for the library, which describes how program components in the library should be preserved under specified conditions. The invention may be used in application extraction tools, and in tools that aim at enhancing performance using whole-program optimizations.

The invention may be used as an optimization to reduce application size by eliminating unreachable methods. In the alternative, the invention may be used as a basis for optimizations that reduce execution time (e.g., by means of call devirtualization), and as a basis for tools for program understanding and debugging.

DETAILED DESCRIPTION OF THE INVENTION

Figure 1:
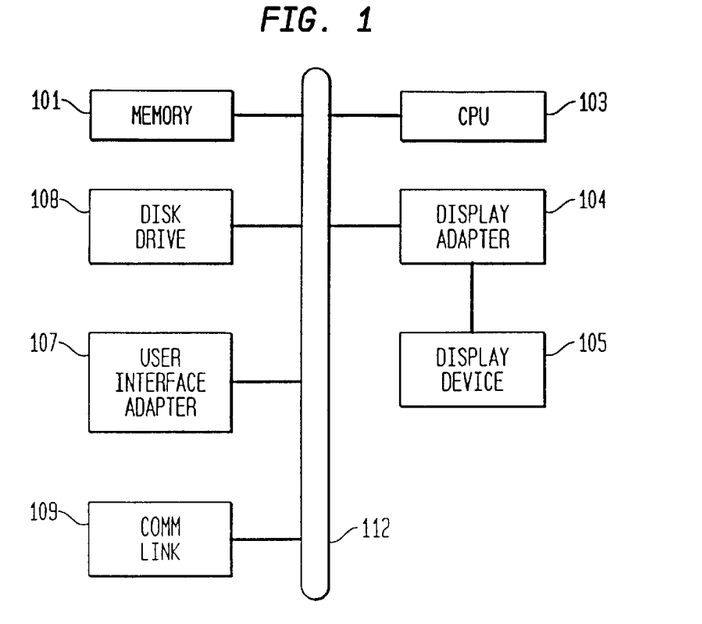
FIG. 1 is a block diagram illustrating a data processing system on which the subject invention may be implemented.

Referring now to the drawings, and more particularly to FIG. 1, there is shown a representative data processing apparatus on which the subject invention may be implemented. The computer processing apparatus includes memory 101 and a central processing unit (CPU) 103. The memory 101 typically includes main memory and cache memory for storing instructions to be executed by the CPU 103 and data to be used in the execution of such instructions.

The CPU 103 is attached via system bus 112 to user interface adapter 107. Typically, the user interface adapter 107 has attached to it a keyboard, a mouse, and/or other user interface. in addition, a display device 105 (such as a cathode ray tube display or a liquid crystal display) is connected to the system bus 112 via a display adapter 104.

The computer system's operating system (and other utilities), application program code and data are stored in persistent memory and temporarily loaded into memory 101 for execution by the CPU 103. The persistent memory is typically provided by a disk drive 108 coupled to the CPU via system bus 112. In addition, persistent memory may be provided by remote resources coupled to the CPU 103 via the system bus 112 and a communication link 109. In this case, portions of the computer system's operating system (or other utilities), and portions of the application program code and data may be retrieved from remote resources via the communication link 109 and loaded into memory 101 for execution by the CPU 103. The methodology of the present invention as described below is preferably implemented as application program code that is stored in persistent memory (or retrieved from remote resources) and loaded into memory 101 for execution by the CPU 103.

In order to better understand the invention, some background material is presented regarding the notions of class hierarchies and virtual method dispatch in object-oriented programming languages. The example programs discussed in this document are written in the Java programming language. For a definition of the Java language, refer to James Gosling, Bill Joy, and Guy Steele, "The Java Language Specification", Addison-Wesley, 1996, herein incorporated by reference in its entirety.

The following aspects of class hierarchies are relevant for the present invention:

A class hierarchy contains a set of classes. Note that in some languages (e.g., Java) the term interface or abstract class is used to refer to a class whose functionality is restricted. Thus, a Java interface may be viewed as a class that cannot be instantiated, and which only specifies the signatures of the methods that it contains. Java interfaces can be treated as classes for the purposes of the method described in this document.

Each class in the hierarchy contains a set of members, which includes a set of (virtual) methods and fields to be included in objects that are instances of the class.

A class hierarchy contains a set of inheritance relations between classes. A class can extend the functionality of another class by deriving from it. The former class is referred to as the subclass or derived class, whereas the latter class is known as the superclass or base class. (Note that some languages, e.g., C++, allow a class to have multiple base classes).

Application Extractor

Figure 2:
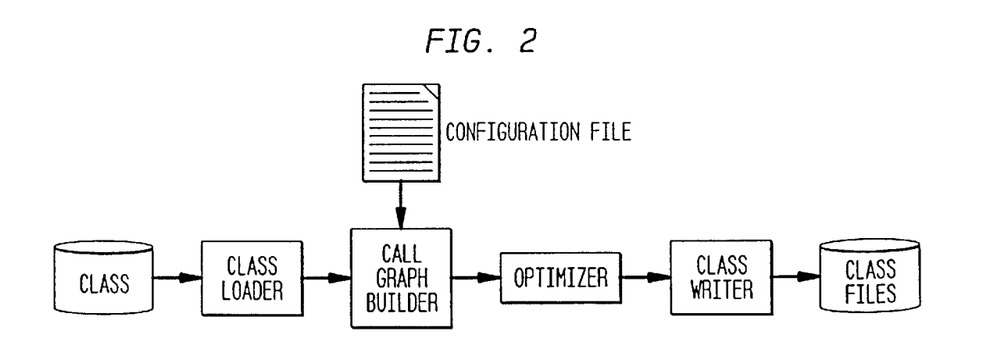
FIG. 2 shows a schematic overview of the design of an application extractor.

FIG. 2 shows a schematic overview of an application extractor in which the present invention is incorporated. The application extractor consist of the following components:

A loader which loads the files that comprise the application and its libraries, and constructs an internal representation of the application. In the Java™ platform, the loader loads class files that comprise the application and its libraries.

A call graph builder which analyzes the internal representation, and constructs a safe approximation of the application's call graph, which identifies all methods that may be potentially executed when the application is run (also referred to herein as "live"). Any method that does not occur in the call graph is definitely not executed when the application is run. In constructing the application's call graph, the call graph builder uses a configuration file, the details of which are set forth below.

After construction of the call graph, an optimizer is preferably used to remove unreachable methods and useless fields (See Sweeney, P. F., and Tip, F., "A study of dead data members in C++ applications," In *Proceedings of the ACM SIGPLAN'98 Conference on Programming Language Design and Implementation* (Montreal, Canada, June 1998), *ACM SIGPLAN Notices* 33(6), pp. 324–332, herein incorporated by reference in its entirety). In addition, the optimizer may perform optimizations to the methods that remain. Such optimizations may include method inlining, class hierarchy transformations (See Tip et al., "Slicing class hierarchies in C++," In *Proceedings of the Eleventh Annual Conference on Object-Oriented Programming Systems, Languages, and Applications* (OOPSLA'96) (San Jose, Calif., 1996), *ACM SIGPLAN Notices* 31(10), pp. 179–197; and Tip, F., and Sweeney, P., "Class hierarchy specialization," In *Proceedings of the Twelfth Annual Conference on Object-Oriented Programming Systems, Languages, and Applications* (OOPSLA'97) (Atlanta, Ga., 1997), *ACM SIGPLAN Notices* 32(10), pp. 271–285; herein incorporated by reference in their entirety), call devirtualization, and traditional compiler optimizations such as common subexpression elimination, constant propagation, and strength reduction (See V. Aho et al., "Compilers Principles, Techniques and Tools," Addison-Wesley, 1986; and Zima, H. and Chapman, B., "Supercompilers for Parallel and Vector Computers," ACM Press, New York, 1991; herein incorporated by reference in their entirety). Another optimization performed by this component may be the renaming of classes, methods, and fields (See Tip et al., "Practical experience with an application extractor for java™," In *Proceedings of the Fourteenth Annual Conference on Object-Oriented Programming Systems, Languages, and Applications* (OOPSLA'99) (Denver, Colo., 1999), incorporated by reference above in its entirety).

Finally, a writer component produces a set of files comprising the optimized application. These files may be a source representation of the program, an intermediate-level representation of the program, or a representation suitable for execution on a particular platform. For example, the writer component may produce files suitable for execution on the Java™ platform (in which case the writer component produces a set of class files that are suitable for execution on a Java™ virtual machine). An example of such a class writer component is described in Vallee-Rai et al., "Soot—a Java Bytecode Optimization Framework," Proceedings of CASCON'99, Nov. 8–11, 1999, Missisauga, Ontario, Canada, available from http://www.sable.mcgill.ca/publications/#cascon99 as of the filing of the present invention, herein incorporated by reference in its entirety.

The constitutions and functions of these elements are well known in the art and will not be otherwise described here. For example, further description on the various functionality of the tool and/or compiler described above may be found in A. V. Aho et al., "Compilers Principles, Techniques and Tools, Addison-Wesley, 1986, incorporated by reference above in its entirety.

Several application extractors have been described in the literature. Such tools are discussed in Agesen et al., "Sifting out the gold: Delivering compact applications from an exploratory object-oriented programming environment," In *Proceedings of the Ninth Annual Conference on Object-Oriented Programming Systems, Languages, and Applications* (OOPSLA'94) (Portland, Oreg., 1994), *ACM SIGPLAN Notices* 29(10), pp. 355–370; Agesen, "Concrete Type Inference: Delivering Object-Oriented Applications," Sun Microsystems Laboratories Technical Report SMLI TR-96-52, December 1995; Tip et al., "Practical experience with an application extractor for java™," In *Proceedings of the Fourteenth Annual Conference on Object-Oriented Programming Systems, Languages, and Applications* (OOPSLA'99) (Denver, Colo., 1999); *IBM Smalltalk User's Guide*, version 3, release 0 ed., IBM Corp, 1995, Chapters 36–38; Smalltalk/V for win32 Programming, Digitalk Inc., 1993, Chapter 17; and ParcPlace Smalltalk, objectworks release 4.1 ed., 1992, Sections 16, 28; incorporated by reference above in their entirety.

Configuration Files

The configuration files used by the application extractor may include unconditional and conditional directives.

Unconditional directives specify a set of components of a program that are to be classified as potentially executable unconditionally. In an object-oriented programming platform such as Java™, the components of a program that are specified by a directive preferably includes one or more classes of objects, and/or methods and fields to be included in objects that are instances of a given class of objects.

Unconditional directives preferably take one of the following forms:

PRESERVECLASS <className>
PRESERVEMETHOD <methodName>
PRESERVEFIELD <fieldName>

The semantics of these exemplary unconditional directives are as follows.

Any class C listed in the configuration file using the PRESERVECLASS directive is assumed to be instantiated, and the application extractor will not make assumptions about where objects of type C may occur in the application. Furthermore, the application extractor will assume that the identity of class C must be preserved. This implies that C cannot be removed, renamed or merged into another class.

Any method m listed in the configuration file using the PRESERVEMETHOD directive is assumed to be executed, and the application extractor will not make assumptions about where method m is called from. Furthermore, the application extractor will assume that the identity of method m must be preserved. This implies that method m cannot be removed or renamed, and that the identity of any class C referenced in m's signature must be preserved as well.

Any field f listed in the configuration file using the PRESERVEFIELD directive is assumed to be accessed, and the application extractor will not make assumptions about where field f is accessed from. Furthermore, the application extractor will assume that the identity of field f must be preserved. This implies that f cannot be removed or renamed, and that the identity of any class C referenced in f's type must be preserved as well.

Conditional directives specifies: i) a condition associated with a first set of components of the program (e.g., the first set of components of the program are determined to be potentially executable when the program is run); and ii) a second set of components of the program that are to be classified as potentially executable in the event that the condition is satisfied. Conditional directives preferably take one of the following forms:

PRESERVECLASS <className> WHEN LIVEMETHOD <methodName>
PRESERVEMETHOD <methodName1> WHEN LIVEMETHOD <methodName2>
PRESERVEFIELD <fieldName> WHEN LIVEMETHOD <methodName>

The semantics of these exemplary conditional directives are as follows.

Any class C listed in the configuration file using a conditional directive of the form PRESERVECLASS C WHEN LIVEMETHOD m directive is assumed to be instantiated if method m is determined to be live. In this case, the application extractor will not make assumptions about where objects of type C may occur in the application, and the application extractor will assume that the identity of class C must be preserved. This implies that C cannot be removed, renamed or merged into another class.

Any method m listed in the configuration file using a conditional directive of the form PRESERVEMETHOD m WHEN LIVEMETHOD n directive is assumed to be executed if method n is determined to be live. In this event, the application extractor will not make assumptions about where method m is called from. Furthermore, it will be assumed that the identity of method m must be preserved. This implies that m cannot be removed or renamed, and that the identity of any class C referenced in m's signature must be preserved as well.

Any field f listed in the configuration file using a conditional directive of the form PRESERVEFIELD f WHEN LIVEMETHOD m directive is assumed to be accessed if method m is determined to be live. In this case, it will be assumed that the identity of field f must be preserved. This implies that f cannot be removed or renamed, and that if the type of f is a class C, then C's identity must be preserved as well.

The IMPORT directive serves to enable modular composition of configuration files, and takes the form: IMPORT <fileName>, where <filename> is the name of another configuration file. This has the same effect of adding the contents of <filename> to the configuration file containing the IMPORT directive.

Use of Configuration Files by the Call Graph Builder

The call graph builder preferably operates as follows. The operation starts with a set of "root" methods that are either directly invoked by the user, or by the run-time system (as is for example the case for applets). Then, the following steps are repeatedly performed:

(1) The body of a reached method is analyzed and information is collected. Although different call graph construction algorithm algorithms determine different amounts of information, all such algorithms identify a set of call sites in the method.

(2) For a given call site, a set of target methods is determined. A "target method" denotes a method that is reachable from a virtual call site via a dynamic dispatch. Different algorithms use a varying amount of information to do this. For example, class hierarchy analysis only uses the class hierarchy, and RTA also uses instantiated class information. Target methods that have not been analyzed yet using step (1) need to be scanned. Some algorithms reanalyze a method as more detailed information becomes available.

The present invention is preferably integrated into the framework described above as follows. As a method is determined to be reachable, the configuration file is searched for "matching" conditions. If a conditional rule of the form "PRESERVEMETHOD m WHEN LIVEMETHOD n", method m will be analyzed using step (1). Note that this may give rise to the identification of additional call sites in step (2).

In addition, the conditional rules of the form:

PRESERVECLASS c WHEN LIVEMETHOD m

PRESERVEFIELD f WHEN LIVEMETHOD m are useful for algorithms that rely on additional information to determine targets of virtual call sites. For example, RTA keeps track of the classes that are instantiated in the application in order to approximate the target methods that can be reached from virtual method calls. Any class that is found to be instantiated using a "PRESERVECLASS c WHEN LIVEMETHOD m" condition has to be taken into account.

Any call-graph construction algorithm can be adapted to accommodate the configuration file directives described above. As an example, we will give a high-level overview how the RTA algorithm can be adapted to take into account the exemplary conditional and unconditional directives set forth above. The RTA algorithm is described in detail in Bacon, D. F., "Fast and Effective Optimization of Statically Typed Object-Oriented Languages", Computer Science Division, University of California, Berkeley, Report No. UCB/CSD-98-1017, December 1997, and Bacon, D. F., and Sweeney, P. F., "Fast static analysis of C++ virtual function calls," In *Proceedings of the Eleventh Annual Conference on Object-Oriented Programming Systems, Languages, and Applications* (OOPSLA'96) (San Jose, Calif., 1996), *SIGPLAN Notices* 31(10), pp. 324–341, herein incorporated by reference in their entirety. We will describe an adaptation of RTA that simultaneously computes a safe approximation of the set of accessed fields as the call graph is constructed, along the lines described in Sweeney, P. F., and Tip, F., "A study of dead data members in C++ applications," In *Proceedings of the ACM SIGPLAN'98 Conference on Programming Language Design and Implementation* (Montreal, Canada, June 1998), *ACM SIGPLAN Notices* 33(6), pp. 324–332 (although we will not make the distinction between read-access and write-access to fields here). Other algorithms that can be similarly adapted include class hierarchy analysis (see Dean et al., "Optimization of object-oriented programs using static class hierarchy analysis," In Proceedings of the Ninth European Conference on Object-Oriented Programming (*ECOOP'95*) (Aarhus, Denmark, August 1995), W. Olthoff, Ed., Springer-Verlag, pp. 77–101, incorporated by reference in its entirety), and type propagation-based algorithms (see Agesen, "Concrete Type Inference: Delivering Object-Oriented Applications," Sun Microsystems Laboratories Technical Report SMLI TR-96-52, December 1995, incorporated by reference in its entirety).

RTA is an iterative algorithm that maintains the following information:

data identifying a set M of methods to which virtual calls have been encountered, data identifying a set I of classes that may be instantiated during execution, data identifying a set R of methods that are reachable during execution, and data identifying a set F of fields that may be accessed during execution.

RTA begins by performing a number of initializations.

(a) the data identifying the set R is initialized to identify a set of initially reachable methods (such as an application's main method), and the data indentifying sets I, M, and F are initialized to identify the empty set.

Then, RTA repeatedly performs the following steps until no more elements are added to any of the sets M, I, R, and F:

(b) Process a method in R that has not been processed before. This involves scanning the method's code for virtual calls to other methods, and for instantiations of classes. If a virtual call to a method m that does not yet occur in M is encountered, data identifying m is added to the data identifying set M. If a direct call to a method n is encountered that does not yet occur in R, data identifying the method n is added to the data identifying set R. If an instantiation of a class c is encountered that does not yet occur in I, data identifying class c is added to the data identifying set I. If an access to a field f that does not yet occur in F is encountered, data identifying field f is added to the data identifying set F.

(c) Resolve a virtual call to a method m in M w.r.t. an instantiated class c in I. This involves an upward traversal of the class hierarchy starting at class c, until a method m' is found with the same signature as m. If data identifying method m' does not already occur in the data identifying set R, data identifying method m' is added to the data identifying set R.

Steps (b) and (c) are performed repeatedly until no new classes are added to set I, no new methods are added to set R, no new methods are added to set M, and no new fields are added to set F.

RTA only requires a few modifications to accommodate configuration files with conditional and unconditional directives. Unconditional directives are processed as follows:

(d) when the data identifying the set I of classes is initialized, for each class c that is listed in an unconditional directive of the form PRESERVECLASS c in the configuration file, data identifying the class c is added to the data identifying the set of instantiated classes I.

(e) when the data identifying the set R of methods is initialized, for each method m that is listed in an unconditional directive of the form PRESERVEMETHOD m, data identifying the method m is added to the data identifying the set of reachable methods R.

(f) when the data identifying the set F of accessed fields is initialized, for each field f that is listed in an unconditional directive of the form PRESERVEFIELD f is added to the set of accessed fields F.

Preferably, each of the steps (d)–(f) are performed once, immediately after performing the initialization of the sets in step (a).

Conditional directives are processed as follows.

(g) when data identifying a new method m (or m') is added to the set R in step (b) (or step (c)), a check is performed to determine whether the configuration file contains any conditional directive of the form PRESERVECLASS x when LIVEMETHOD m (or PRESERVECLASS x when LIVEMETHOD m'). In the event that the configuration file contains such a conditional directive, data identifying the class x is added to the data identifying set I.

(h) when data identifying a new method m (or m') is added to the set R in step (b) (or step (c)), a check is performed to determine whether the configuration file contains any conditional directive of the form PRESERVEMETHOD m" when LIVEMETHOD m (or PRESERVEMETHOD m" when LIVEMETHOD m'). In the event that the configuration file contains such a conditional directive, data identifying the method m" is added to the data identifying set R.

(i) when data identifying a new method m (or m') is added to the set R in step (b) (or step (c)), a check is performed to determine whether the configuration file contains any conditional directive of the form PRESERVEFIELD f when LIVEMETHOD m (or PRESERVEFIELD f when LIVEMETHOD m'). In the event that the configuration file contains such a conditional directive, data identifying the field f is added to the data identifying the set F.

Preferably, steps (g)–(i) are performed repeatedly along with steps (b) and (c), as long as no new elements are added to the sets I, M, F, and R.

EXAMPLE

Figure 3:
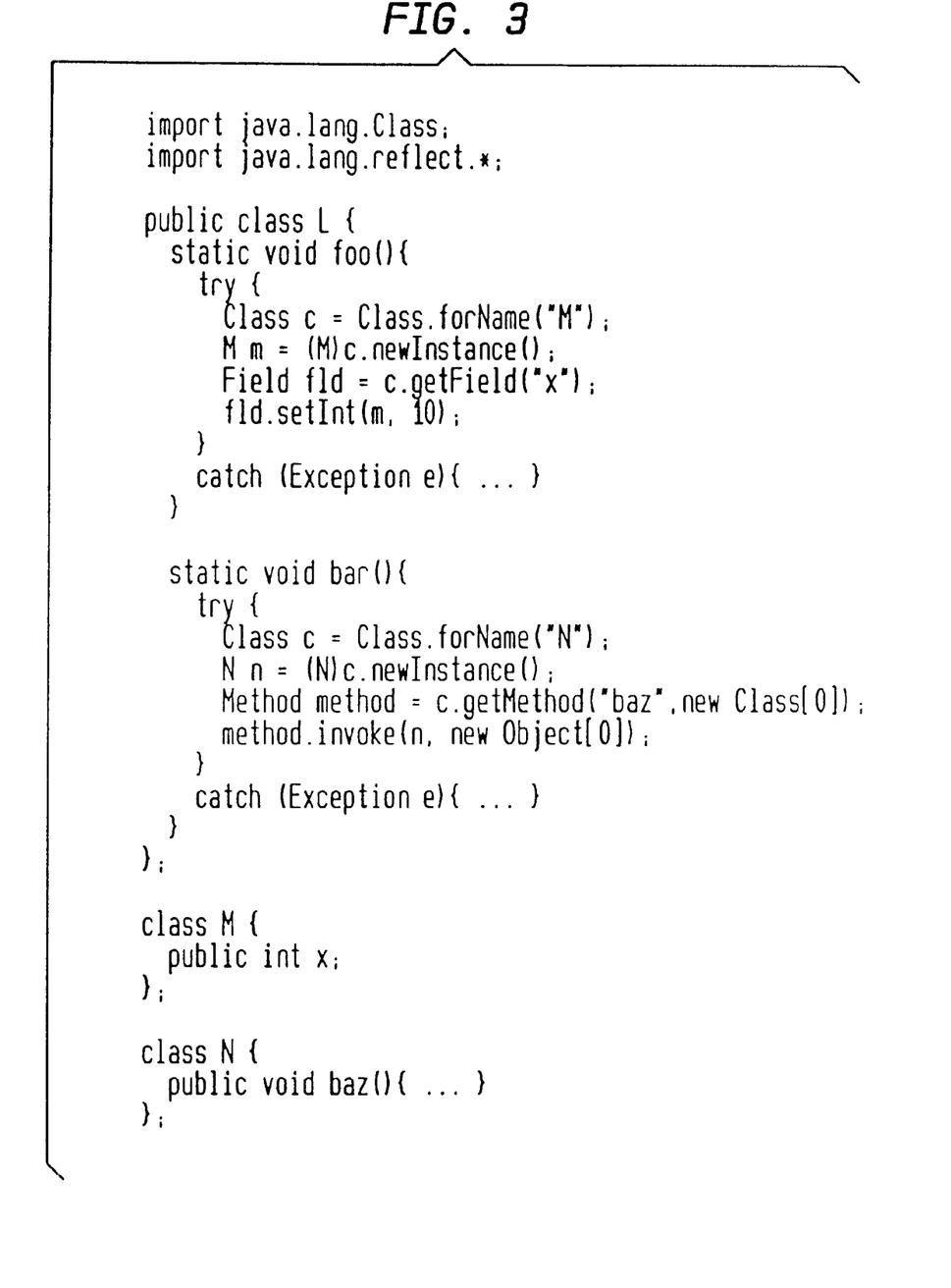
FIG. 3 shows an example of a class library that uses several reflection features.

FIG. 3 shows a small class library in which reflection is used. The library consists of 3 classes: L, M and N. Class L has two methods: foo and bar. Method foo uses reflection to dynamically load class M, create an object of type M, and assign the value '10' to the integer field x of that object. Method bar uses reflection to dynamically load class N, create an object of type N, and invoke the baz method on that object. For convenience, the term library class will henceforth be used to refer to classes that occur in a class library, and the term application class will be used to referred to classes that are not part of a class library. It is assumed that library classes do not inherit from application classes.

Figure 4:
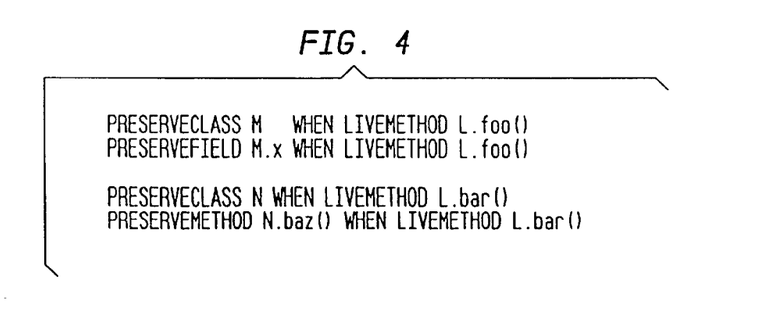
FIG. 4 shows a configuration file for the class library of FIG. 3.

FIG. 4 shows a configuration file library.conf for the class library of FIG. 3. This configuration file specifies the following:

class M is instantiated and should be preserved if method L.foo ( ) is live, field M.x should be preserved if method L.foo ( ) is live, class N is instantiated and should be preserved if method L.bar ( ) is live, and method N. baz should be preserved if method L.bar ( ) is live.

Figure 5:
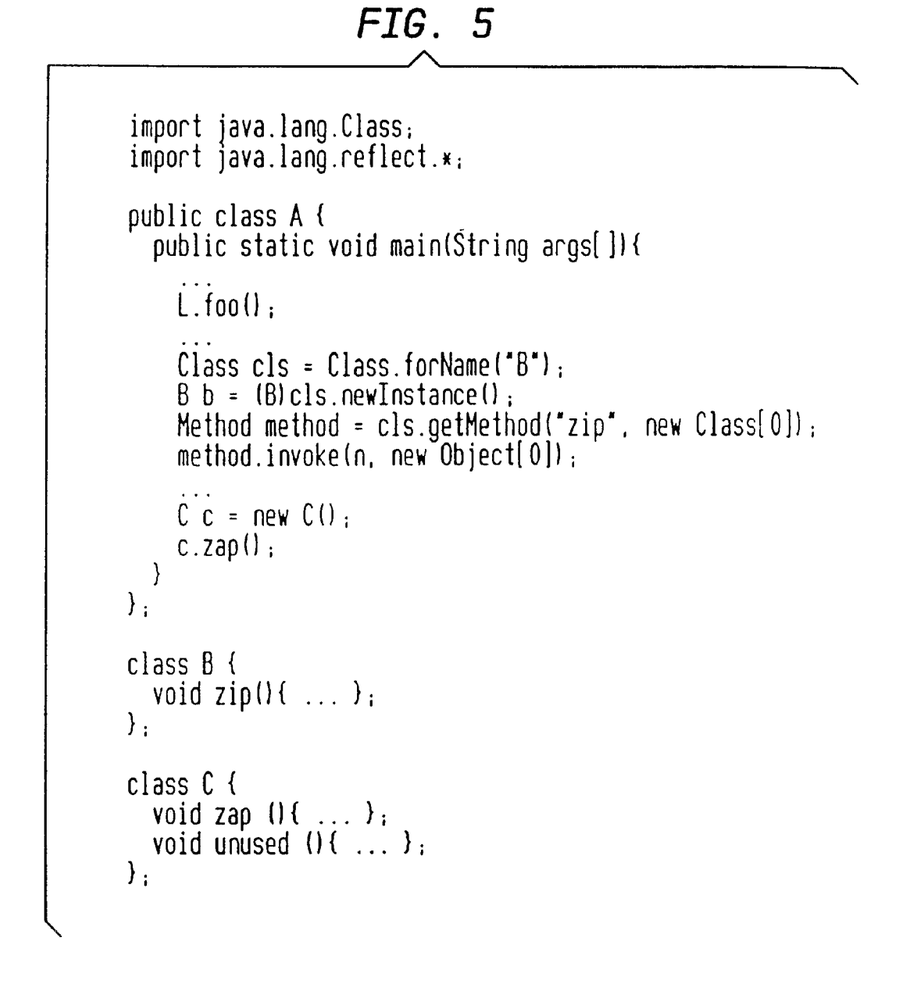
FIG. 5 shows an example of an application that uses the class library of FIG. 3.

FIG. 5 shows an application that uses the library of FIG. 3. Observe that this application dynamically loads class B, that it uses reflection to create an instance of type B, and that it uses reflection to invoke method B.zip( ) on that B-object.

Figure 6:
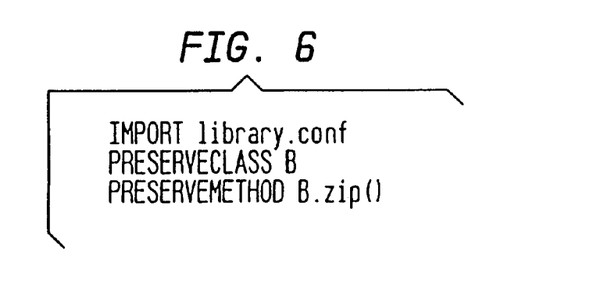
FIG. 6 shows a configuration file appl.conf for the application of FIG. 5.

FIG. 6 shows an exemplary configuration file appl.conf for this application. Observe that the configuration file library.conf is imported into this file, and that the class B and method B.zip ( ), which are accessed using reflection, are listed in unconditional directives as components that should be preserved.

We will now briefly discuss how the call graph construction proceeds for the example application of FIG. 5 using configuration file appl.conf.

First, the set R of reached methods is initialized to {A.main( )}, and I, M, and F are initialized to the empty set { }. Hence, the initial values of these sets are as follows:

R={A.main( )}
I={ }
M={ }
F={ }

Next, the instructions in the body of method A.main ( ) are scanned. Since this method contains a virtual call to method C.zap( ), a direct call to L.foo( ), and an instantiation of class C, then data identifying the method C.zap( ) is added to the data identifying set M, data identifying the method L.foo( ) is added to the data identifying the set R, and data identifying the class C is added to the data identifying the set I. Hence, we have the following situation:

R={A.main( ) , L.foo( )}
I={C}
M={C.zap( )}
F={ }

Adding data identifying the method L.foo( ) to data identifying the set R triggers a check if there are any conditional directives dependent on this method. Since the imported configuration file library.conf contains the lines PRESERVECLASS M WHEN LIVEMETHOD L.foo( ), and PRESERVEFIELD M.x WHEN LIVEMETHOD L.foo( )

data identifying the class M is added to the data identifying the set R, and data identifying the field M.x is added to data identifying set F.

Resolving the virtual call to C.zap( ) in M w.r.t. instantiated class C in I results in the identification of C.zap( ) as a reachable method. Hence, data identifying the method C.zap( ) is added to the data identifying the set R. Hence, we have the following situation:

R={A.main( ), L.foo( ), C.zap( )}
I={C, M}
M={C.zap( )}
F={M.x}

Figure 7:
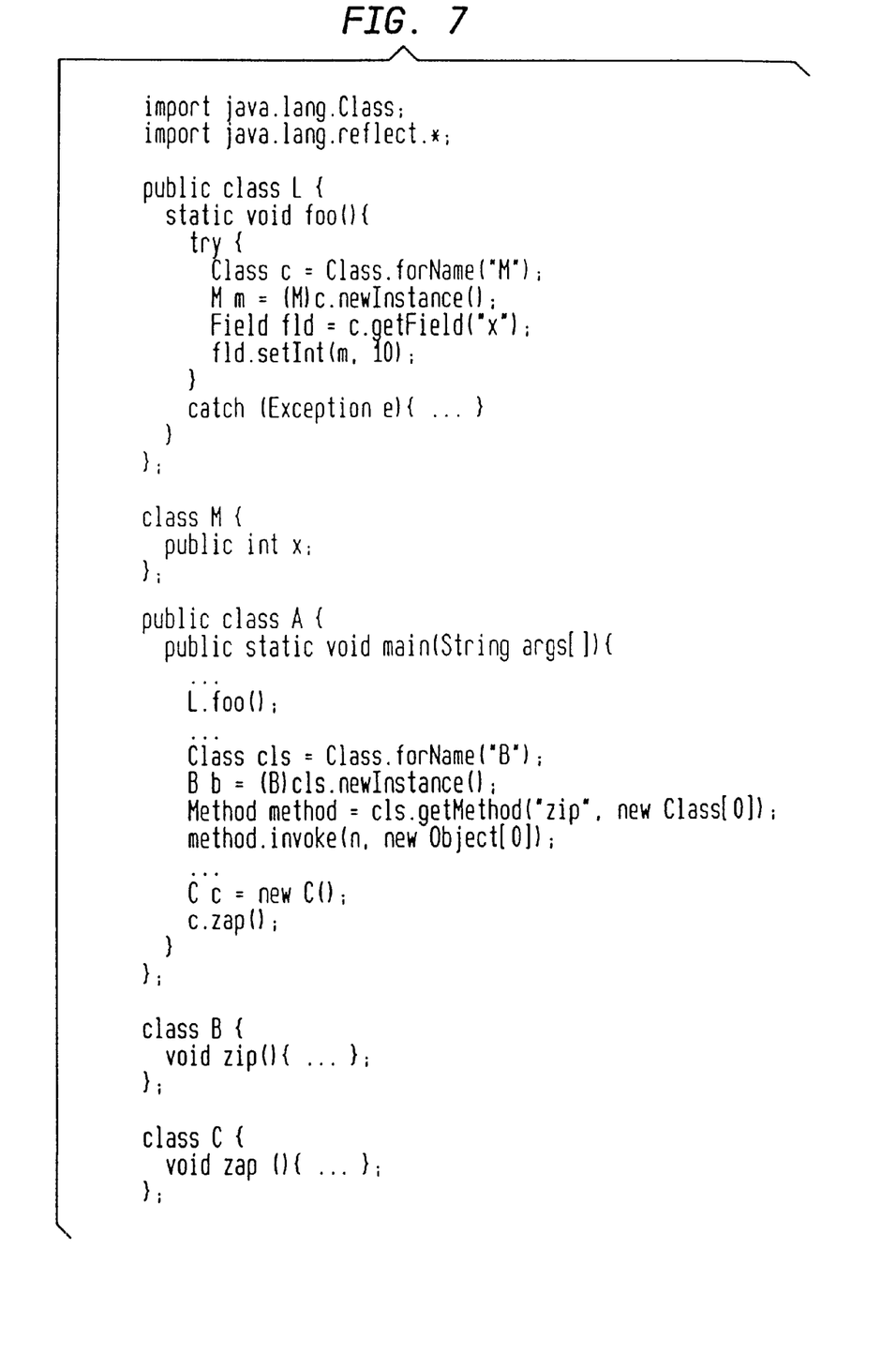
FIG. 7 shows a source-level view of the application of FIG. 5 as produced by the application extractor of the present invention.

After this, no new elements are added to the sets R, I, M, and F. FIG. 7 shows a source-level view of the application program produced by the application extractor. Observe the following components have been removed:

library class N, library method L.bar( ), and application method C. unused( )

Note that the representation of the application program produced by the application extractor need not be a source representation as shown in FIG. 7, but may be an intermediate representation of the program, or a representation suitable for execution on a particular platform, such as the Java™ platform.

The application extractor may subsequently perform program transformations and optimizations to the methods in the call graph, with the constraint that any classes, methods, and fields listed in an unconditional or conditional PRESERVE directive should retain their identity. Specifically, classes M and B, field M.x, and method B.zip( ) should retain their identity, and should not be renamed or transformed.

The incorporation of "conditionally preserve" directives in configuration files has the advantage that one can write a single configuration file for a class library, which can be shared by multiple applications that use that library. Moreover, each application can be extracted precisely, in a way that only extracts the library functionality used by that application.

This enables a distribution model for class libraries in which the vendor of a library L supplies a configuration file F with unconditional and/or conditional directives for classes, methods, and fields that are accessed in L, preferably via a reflection mechanism in L. In order to extract an L-based application A, the user augments F with additional directives for A, and uses the resulting configuration file F' to precisely extract the used components of L and A.

The advantage of this distribution model is that the author of the class library (who is familiar with the use of reflection in the library) writes the configuration file for the library, and that the end-user can precisely extract the library components required by his application, without having detailed knowledge of the library code.

The technique of the present invention may also be integrated into an application for program understanding and debugging. More specifically, the methodology described above may be applied to an input program that uses methods in a class library to generate data that identifies components of the input program and class library that are potentially used in the execution of the input program based upon the conditional directive. The identified component(s) are then reported to the user via the display device 38 or other user interface device for program understanding purposes or debugging purposes.

While the invention has been described above with respect to particular embodiments thereof, those skilled in the art will recognize that the invention can be practiced with modification within the spirit and scope of the appended claims.

We claim:

1. A method for analyzing an object-oriented program implementing reflection comprising a plurality of components, the method comprising the steps of:

providing data including at least one conditional directive, wherein the conditional directive specifies i) a condition associated with a first set of components, and ii) a second set of components that are to be classified as live if the condition is satisfied, wherein the plurality of components comprise classes, methods, and fields;

determining whether a given class is live when the given class may be instantiated by refection during any execution of the program;

determining whether a given method is live when the given method may be called by refection during any execution of the program;

determining whether a given field is live when the given field may be accessed by refection during any execution of the program; and generating data identifying components that are live based upon the conditional directive.

2. The method of claim 1, wherein the generating step comprises the steps of:

(a) constructing an initial call graph of the program;

(b) extending the call graph using information about components that have been classified as live;

(c) extending the call graph using the conditional directive; and (d) identifying in the program any component that is classified as live;

where steps (b), (c), and (d) are preferably performed repeatedly until no further components are added to the call graph.

3. The method of claim 2, wherein the condition associated with the first set of components is based upon usefulness of the first set of components during any execution of the program.

4. The method of claim 3, wherein the condition associated with the first set of components is satisfied if at least one component in the first set of components is used during any execution of the program.

5. The method of claim 1, further comprising the step of generating a representation of the program based upon the data.

6. The method of claim 5, wherein the representation of the program omits components that are determined not to be live.

7. The method of claim 1, further comprising the step of identifying at least one component of the program that is live, and reporting the at least one component to a user via a graphical user interface.

8. The method of claim 1, wherein the first set of components include components that are part of a library used by the program.

9. The method of claim 1, wherein the data including at least one conditional directive is derived from at least two distinct files, wherein one of the distinct files is associated with program, and wherein another of the distinct files is associated with the library.

10. The method of claim 1, wherein one of the distinct files includes an import directive that provides a mechanism to import directives from another file.

11. A program storage device readable by a machine, tangibly embodying a series of instructions executable by the machine to perform method steps for analyzing an object-oriented program implementing reflection comprising a plurality of components, the method steps comprising:

providing data including at least one conditional directive, wherein the conditional directive specifies i) a condition associated with a first set of components, and ii) a second set of components that are to be classified as live if the condition is satisfied, wherein the plurality of components comprise classes, methods, and fields;

determining whether a given class is live when the given class may be instantiated by refection during any execution of the program;

determining whether a given method is live when the given method may be called by refection during any execution of the program;

determining whether a given field is live when the given field may be accessed by refection during any execution of the program; and generating data identifying components that are live based upon the conditional directive.

12. The program storage device of claim 11, wherein the generating step comprises the steps of:

(a) constructing an initial call graph of the program;

(b) extending the call graph using information about components that have been classified as live;

(c) extending the call graph using the conditional directive; and (d) identifying in the program any component that is classified as live;

where steps (b), (c), and (d) are preferably performed repeatedly until no further components are added to the call graph.

13. The program storage device of claim 12, wherein the condition associated with the first set of components is based upon usefulness of the first set of components during any execution of the program.

14. The program storage device of claim 13, wherein the condition associated with the first set of components is satisfied if at least one component in the first set of components is used during any execution of the program.

15. The program storage device of claim 11, further comprising the step of generating a representation of the program based upon the data.

16. The program storage device of claim 15, wherein the representation of the program omits components that are determined not to be live.

17. The program storage device of claim 11, further comprising the step of identifying at least one component of the program that is live, and reporting the at least one component to a user via a graphical user interface.

18. The program storage device of claim 11, wherein the first set of components include components that are part of a library used by the program.

19. The program storage device of claim 11, wherein the data including at least one conditional directive is derived from at least two distinct files, wherein one of the distinct files is associated with program, and wherein another of the distinct files is associated with the library.

20. The program storage device of claim 11, wherein one of the distinct files includes an import directive that provides a mechanism to import directives from another file.

* * * * *